US012803235B2

(12) United States Patent
Gerwig et al.

(10) Patent No.: US 12,803,235 B2
(45) Date of Patent: Nov. 17, 2026

(54) ADAPTER FOR AN AUTOMATION FIELD DEVICE

(71) Applicant: Endress+Hauser SE+Co. KG, Maulburg (DE)

(72) Inventors: Simon Gerwig, Schopfheim (DE); Christian Strittmatter, Rickenbach (DE); Lars Kretschmer, Lörrach (DE); Christian Mutter, Huttingen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 206 days.

(21) Appl. No.: 18/841,987

(22) PCT Filed: Feb. 24, 2023

(86) PCT No.: PCT/EP2023/054643

§ 371 (c)(1),
(2) Date: Aug. 27, 2024

(87) PCT Pub. No.: WO2023/165902

PCT Pub. Date: Sep. 7, 2023

(65) Prior Publication Data

US 2025/0286334 A1 Sep. 11, 2025

(30) Foreign Application Priority Data

Mar. 4, 2022 (DE) ..................... 10 2022 105 194.3

(51) Int. Cl.
*H01R 31/06* (2006.01)
*H01R 103/00* (2006.01)
(Continued)

(52) U.S. Cl.
CPC ........... *H01R 31/065* (2013.01); *H02H 9/008* (2013.01); *H02H 9/04* (2013.01); *H01R 2103/00* (2013.01)

(58) Field of Classification Search
CPC .. H01R 31/065; H01R 2103/00; H02H 9/008; H02H 9/04
(Continued)

(56) References Cited

U.S. PATENT DOCUMENTS

2013/0155564 A1* 6/2013 Schmidt ................ H02H 9/025 361/93.9
2019/0058326 A1 2/2019 Esposito

FOREIGN PATENT DOCUMENTS

DE 2544482 A1 4/1977
DE 3931537 A1 4/1991
(Continued)

OTHER PUBLICATIONS

Machine translation of Schauble et al. German Patent Document DE 102018127779 A1 May 2020 (Year: 2020).*

*Primary Examiner* — Kevin J Comber
(74) *Attorney, Agent, or Firm* — Mark A. Logan; Endress+Hauser (USA) Holding, Inc.

(57) ABSTRACT

An adapter for introduction into a two-conductor line comprises an adapter housing; and, arranged in the adapter housing, an adapter electronics that connects a first terminal with a third terminal using a first connecting line and a second terminal with a fourth terminal using a second connecting line, wherein the adapter electronics further includes an overvoltage protection system designed to limit a voltage applied across the third and fourth terminals to a first maximum value in the event of failure; an overcurrent protection system adapted to prevent a rise of the loop current above a maximum electrical current value in the event of failure; and a circuit adapted in the non-failure case to control a voltage applied to the overvoltage protection system, from a minimum input voltage, to a second maximum value lower than the first maximum value.

10 Claims, 2 Drawing Sheets

(51) Int. Cl.
*H02H 9/00* (2006.01)
*H02H 9/04* (2006.01)

(58) Field of Classification Search
USPC .......................................................... 361/111
See application file for complete search history.

(56) References Cited

FOREIGN PATENT DOCUMENTS

| | | | | |
|---|---|---|---|---|
| DE | 4403961 | A1 | 8/1995 | |
| DE | 20005927 | U1 | 10/2000 | |
| DE | 10335203 | A1 | 3/2005 | |
| DE | 102018127779 | A1 * | 5/2020 | ............. G08C 17/02 |
| DE | 102020105605 | A1 | 9/2021 | |

* cited by examiner

ADAPTER FOR AN AUTOMATION FIELD DEVICE

CROSS-REFERENCE TO RELATED APPLICATIONS

The present application is related to and claims the priority benefit of DPMA Patent Application No. 10 2022 105 194.3, filed on Mar. 4, 2022, and International Patent Application No. PCT/EP2023/054643, filed Feb. 24, 2023, the entire contents of which are incorporated herein by reference.

TECHNICAL FIELD

The invention relates to an adapter for introduction into a two-conductor line between a field device of automation technology and a non-Ex capable supply isolator, in order to make the field device Ex capable, especially Ex-ia capable. The invention also relates to an automation system.

BACKGROUND

In automation technology, especially in process automation technology, field devices are often applied, which serve for registering and/or influencing process variables. Serving for registering process variables are sensors, such as, for example, fill level measuring devices, flow measuring devices, pressure—and temperature measuring devices, pH-redox potential measuring devices, conductivity measuring devices, etc., which register the corresponding process variables, fill level, flow, pressure, temperature, pH value, and conductivity. Serving for influencing process variables are actuators, such as, for example, valves or pumps, via which the flow of a liquid in a pipeline section, or the fill level in a container, can be changed. Referred to as field devices are, in principle, all devices, which are applied near to a process and which deliver, or process, process relevant information. In connection with the invention, the terminology, field devices, thus, refers especially also to remote I/Os, radio adapters, and, in general, devices, which are arranged at the field level.

A large number of such field devices are manufactured and sold by the firm, Endress+Hauser.

Many field devices are obtainable in so-called 2-conductor versions (also referred to as two-conductor field devices). In such case, energy supply of the field device occurs via the same line pair (two conductor cable), via which also communication occurs.

Especially in the process industry, however, also in automation technology, physical or technical variables must often be measured, or ascertained, by field devices in regions, in which danger of explosion is present, so-called explosion endangered regions. By suitable measures in the field devices and evaluation systems (such as e.g. voltage- and electrical current limiting), the electrical energy in a signal to be transmitted can be so limited that such signal can under no circumstances (short circuiting, interruptions, thermal effects . . . ) trigger an explosion. For this, corresponding protection principles have been established in IEC EN DIN 60079-ff.

This standard defines, based on the ignition protection types to be applied, structural and circuit measures for the field devices for application in explosion endangered regions. One of these ignition protection types is the ignition protection type "intrinsic safety" (designation Ex-i, IEC EN DIN 60079-11, published June 2012).

The ignition protection type "intrinsic safety" is based on the principle of limiting electrical current to, and voltage on, an electrical circuit. The energy of the electrical current circuit, which could be able to cause an explosive atmosphere to ignite, is so limited that ignition of the surrounding explosive atmosphere cannot take place, neither by sparks nor by impermissible temperature rise of the electrical components.

The ignition protection type "intrinsic safety" defines, in such case, three protection levels, Ex-ia, Ex-ib and Ex-ic. Level a is the highest level, in the case of which two countable failures in their combination do not lead to a malfunction bringing about an ignition (2-failure safety). Level b defines that one countable failure does not lead to a malfunction bringing about an ignition (1-failure safety). Level c correspondingly defines no failure safety, such that in case of a malfunction an ignition can be brought about (0 failure safety).

In order to achieve protection level Ex-ia, it is necessary in the present state of the art that a so-called Ex-supply isolator be applied, via which an input electrical current and an input voltage applied to the two connection terminals of a field device are limited, e.g. to an input voltage less than 35 V and a maximum power of less than 0.8 W.

However, there are a large number of already existing installations in automated plants, in the case of which the field devices are operated without an Ex-supply isolator. Such field devices must then satisfy the ignition protection type Ex-m, potting compound encapsulation, or the ignition protection type Ex-d, pressure resistant encapsulation.

For fulfilling the ignition protection type Ex-m, thus, the parts of the field device, which could ignite an explosive atmosphere by sparks or high temperature, are so embedded in a potting compound that the explosive atmosphere cannot be ignited. This is done by potting the components on all sides with a potting compound resistant against physical-especially electrical, thermal and mechanical—as well as chemical, influences.

For fulfilling the ignition protection type Ex-d, the parts of the field device, which can ignite an explosive atmosphere, are so arranged in a housing that, when an explosion of an explosive mixture occurs in the inner space of the housing, the housing withstands the explosion pressure safely and a transmitting of the explosion to the explosive atmosphere surrounding the housing is prevented.

Such field devices require no specially designed Ex-supply isolator, but, instead, can be operated with a conventional supply isolator. When, now, there should be applied in such existing installations a new field device, which is not formed corresponding to the requirements of Ex-d and/or Ex-m, a switching to a specially designed supply isolator is necessary. This switching involves an increased effort for installation of a (new) field device, in order to meet the requirements of Ex-i.

SUMMARY

An object of the invention, thus, is to provide a way in which a field device can meet the protection level Ex-ia without necessitating changing to a specially designed supply isolator in the existing installation.

The object is achieved by the adapter as well as the system of automation technology as defined in the present disclosure.

The adapter of the invention for introduction into a two-conductor line between a field device of automation technology and a non-Ex capable supply isolator, in order to make the field device Ex capable, especially Ex-ia capable, comprises:

an adapter housing having first and second connecting elements for connecting a first two-conductor line, via which the adapter is connectable with the supply isolator, and having third and fourth connecting elements for connecting a second two-conductor line, via which the adapter is connectable with the field device; and, arranged in the adapter housing, an adapter electronics, which connects the first connecting element with the third connecting element using a first electrical connecting line and the second connecting element with the fourth connecting element using a second electrical connecting line, such that the first connecting line conducts a loop current coming from the supply isolator from the first connecting element to the field device connectable to the third connecting element and the second connecting line conducts the loop current coming from the field device via the fourth connecting element back to the second connecting element at the supply isolator, wherein the adapter electronics further includes an overvoltage protection system, which is designed to limit a voltage applied across the third and fourth connecting elements to a first maximum value in the event of failure, wherein the adapter electronics further includes an overcurrent protection system, which is adapted to prevent a rise of the loop current above a maximum electrical current value in the event of failure, such that a power issuable to the field device is limited, and wherein the adapter electronics further includes a circuit, which is adapted in the non-failure case to control a voltage applied to the overvoltage protection system, from a minimum input voltage, which lies across the first and second connecting elements, to a second maximum value lower than the first maximum value.

According to the invention, an adapter is provided, in the case of which from a defined input voltage at the connection terminals, via which the adapter is connected with a supply isolator, the voltage is limited, or controlled, via an overvoltage protection system with the aid of a circuit, especially a semiconductor circuit, to a certain maximum voltage.

An advantageous embodiment of the adapter of the invention provides that the minimum input voltage applied across the first and second connecting elements is greater than 3 volt, preferably greater than 5 volt, especially preferably greater than 10 volt, quite especially preferably in the range of 10-15 volt.

Another advantageous embodiment of the adapter of the invention provides that the second maximum value lies in the range from 5 to 25 volt, preferably in the range from 7 volt to 25 volt, especially preferably in the range from 12 to 25 volt, quite especially preferably in the range from 17 to 22 volt.

Another advantageous embodiment of the adapter of the invention provides that the overvoltage protection system includes at least three Zener diodes, which are connected in parallel with the third and fourth connecting elements, wherein a cathode of the Zener diodes is connected, in each case, with the first connecting line and an anode of the Zener diodes is connected, in each case, with the second connecting line. Especially, the embodiment can provide that the Zener diodes are so selected that a Z voltage lies in the range of 10-20 V, and preferably amounts to about 16 V.

Another advantageous embodiment of the adapter of the invention provides that the circuit includes a voltage controlled switching element, especially a field effect transistor, for setting a voltage drop, and arranged in the first and/or second connecting line in such a manner that the switching element serves as a voltage divider for a field device connectable to the third and fourth connecting elements.

Another advantageous embodiment of the adapter of the invention provides that the circuit further comprises an operational amplifier, a voltage divider as well as a feedback loop, wherein the operational amplifier is adapted to control the switching element, wherein the voltage divider is preferably adapted to drive a negative input of the operational amplifier using an intermediate tap as a function of an input voltage lying across the first and second connecting elements and/or the feedback loop preferably serves to lead a voltage drop produced by the switching element back to a positive input of the operational amplifier.

Another advantageous embodiment of the adapter of the invention provides that the voltage divider is inserted between the first and second connecting lines and, preferably, is embodied as a high ohm voltage divider, such that a transverse current through the voltage divider is not more than 20 μA, preferably not more than 10 μA, quite especially preferably not more than 5 μA.

An advantageous embodiment of the adapter of the invention provides that the adapter electronics further includes a voltage control unit for the voltage supply of the operational amplifier and is preferably introduced into the first and/or second connecting line in such a manner that the voltage control unit is connected in series with a field device connectable to the third and fourth connecting elements, such that there is no parallel current between the first and second connecting lines. Especially, the embodiment can provide that the voltage control unit comprises a diode, another Zener diode, an additional resistor and/or a voltage stabilizing circuit, especially a reference voltage circuit or a voltage regulator and/or the adapter electronics further includes another Zener diode, which is embodied in such a manner that it is connected in parallel with the voltage control unit, in order to limit an operating voltage for the operational amplifier to a maximum value and/or the adapter electronics includes a limiting resistor, which is connected in front of the Zener diode to protect the operational amplifier and/or the Zener diode.

The invention relates further to an automation system comprising a non-Ex-i capable supply isolator, an automation field device, which is embodied in such a manner that it fulfills the requirements of ignition protection type intrinsic safety Ex-i and an adapter as defined in one or more of the above descriptions, wherein the adapter is connected with the non-Ex-i capable supply isolator at the first and second connecting elements by means of a two-conductor line and with the field device at the third and fourth connecting elements by means of an additional two-conductor line.

An advantageous embodiment of the automation system of the invention and the adapter provides that the field device is further adapted to compensate the transverse current brought about by the voltage divider in the transmitting of measurement- and/or actuating values by means of the loop current.

BRIEF DESCRIPTION OF THE DRAWINGS

The present disclosure will now be explained in greater detail based on the appended drawing, the figures of which show as follows.

DETAILED DESCRIPTION

Figure 1:
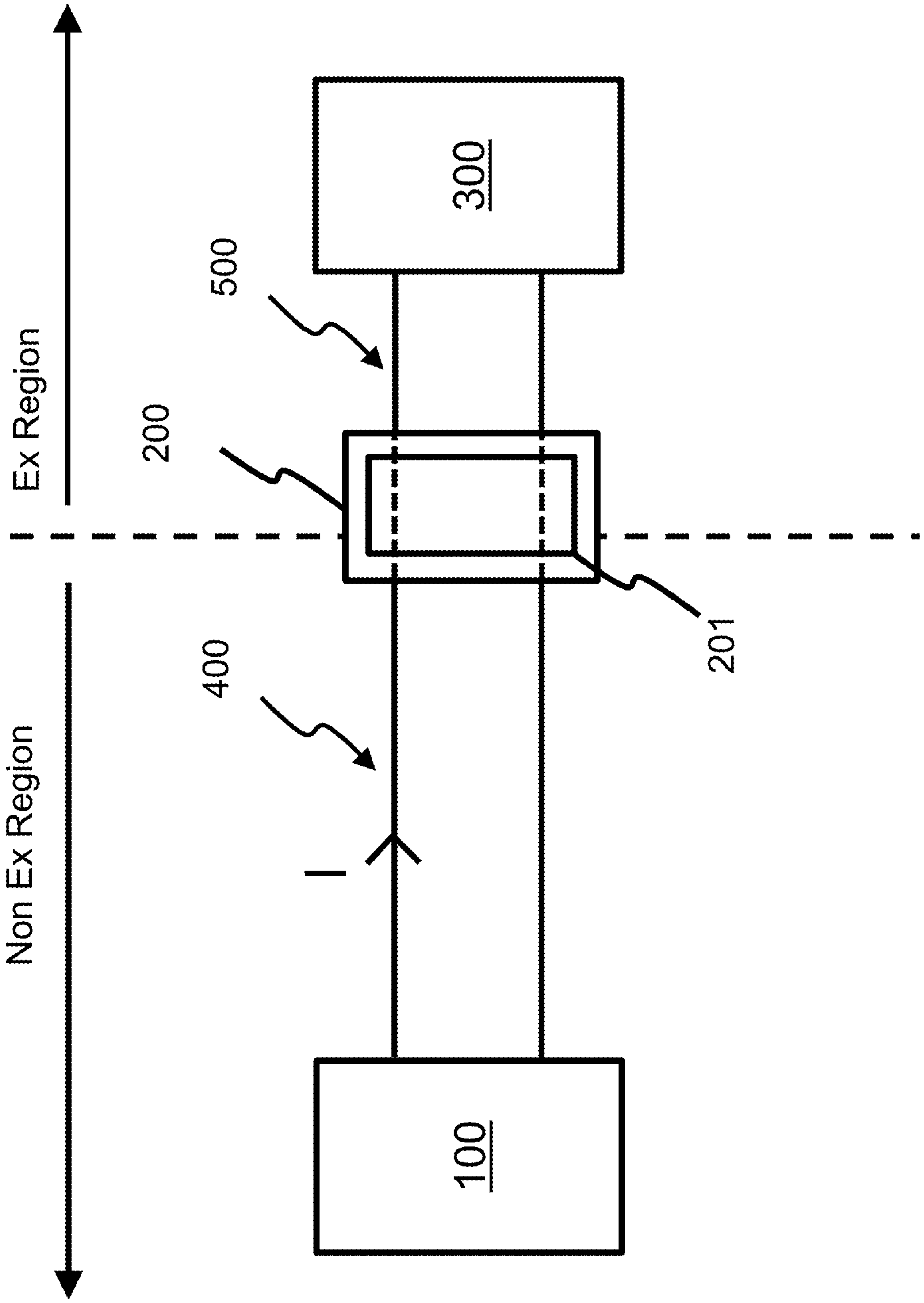
FIG. 1 shows an arrangement comprising an adapter of the present disclosure, a field device of automation technology and a supply isolator.

FIG. 1 shows an arrangement often found in automated plants. In such case, a supply isolator 100 is connected with a field device 300 via a two-conductor line. Via the two-conductor line, measurement- and/or actuating values can be transmitted between the field device 300 and a superordinated unit (not shown), for example, a programmable logic controller (PLC). For example, the measurement- and/or actuating values can be transmitted between the field device and the superordinated unit analogly in the form of a 4-20 mA electrical current signal.

The supply isolator 100 is a non-Ex capable supply isolator, i.e. it is not permitted/suitable for use in an explosion endangered region. Such non-Ex capable supply isolators are typically found, for example, in already existing installations of automated plants, in which Ex-d devices and/or Ex-m devices are applied, i.e. present.

The field device 300 can be a field device 300 designed in such a manner that it fulfills the requirements of ignition protection type Ex-m, potting compound encapsulation, or ignition protection type Ex-d, pressure resistant encapsulation. For example, parts of the field device 300, which can ignite an explosive atmosphere through sparks or high temperature, can be embedded in a potting compound, such that the explosive atmosphere cannot be ignited and the field device is Ex-m capable. Alternatively, parts of the field device 300, which can ignite an explosive atmosphere, can be so arranged in a housing that when explosion of an explosive mixture occurs in the inner space, the housing safely withstands the explosion pressure and a transmitting of the explosion to explosive atmosphere surrounding the housing is prevented and the field device is Ex-d capable.

In order to fulfill the requirements of the protection level Ex-ia of the ignition protection type "intrinsic safety", an adapter of the invention is introduced into the two-conductor line in such a manner that the adapter is arranged between the non-Ex capable supply isolator and the field device 300. The adapter includes an adapter housing 200 and, arranged in the adapter housing 200, an adapter electronics 201 with four connection terminals 202, 203, 204, 205 for connecting the two-conductor line.

Figure 2:
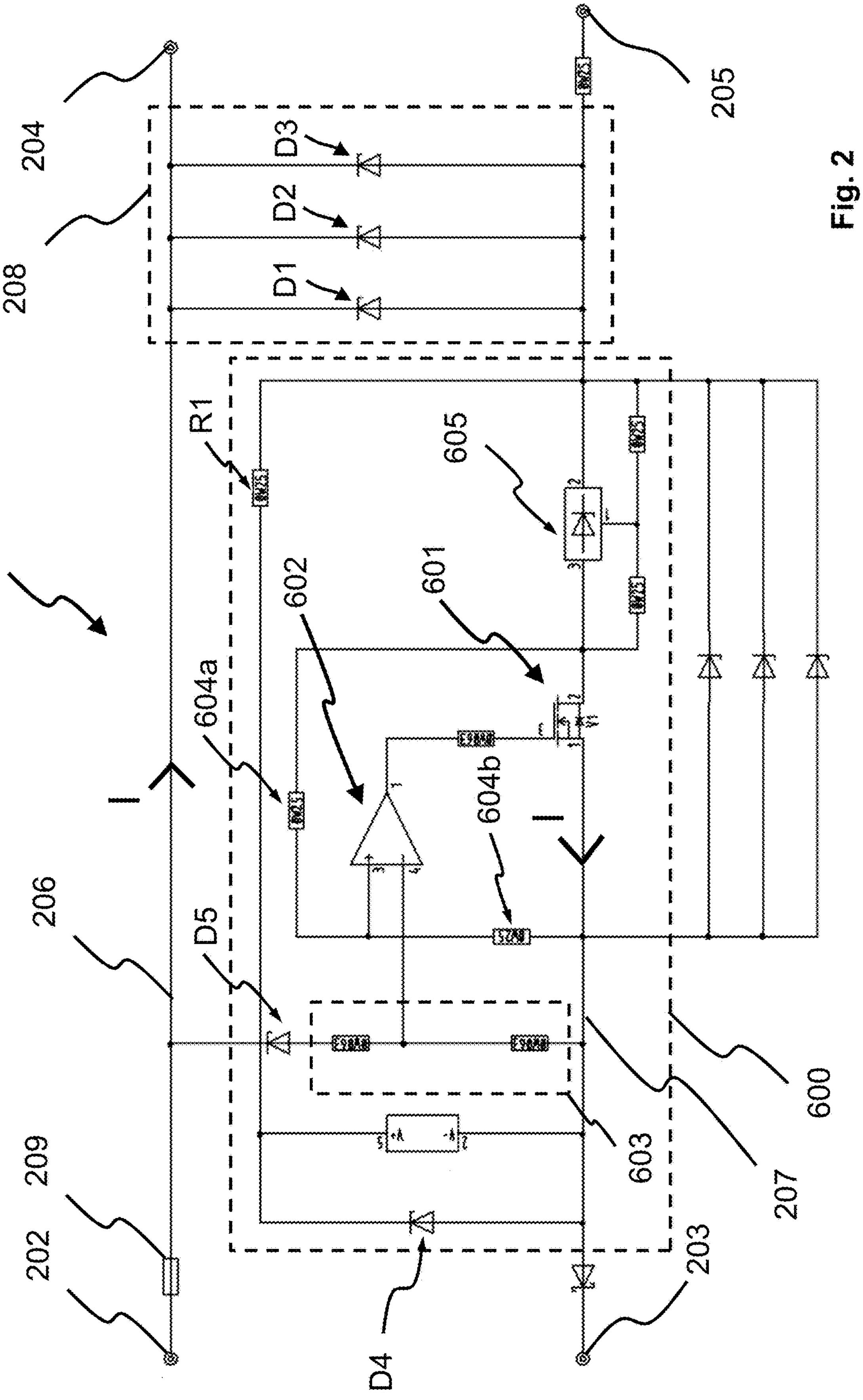
FIG. 2 shows an adapter electronics of the present disclosure in detail.

FIG. 2 shows an adapter electronics 201 in detail. The adapter electronics 201 includes first and second connection terminals 202, 203, which serve to connect to the first two-conductor line 400, which comes from the supply isolator, and third and fourth connection terminals 204, 205, which serve to connect to the second two-conductor line 500, which leads to the field device 300. Furthermore, the adapter electronics 201 includes a first line 206 (in the following also called the plus line), which connects the first connection terminal 202 with the third connection terminal 204, as well as a second line 207 (in the following also called the minus line), which connects the second connection terminal 203 with the fourth connection terminal 205.

In order in the event of failure to limit a voltage on the third and fourth connection terminals 204, 205, a number of, preferably three, Zener diodes D1, D2, D3 are connected in parallel with the connection terminals. The Zener diodes D1, D2, D3 are, in such case, connected in such a manner that a cathode of the Zener diodes is connected with the plus line and an anode with the minus line, such that a Z voltage of the Zener diodes lies across the third and fourth connection terminals 204, 205 and, thus, defines an output voltage of the adapter for the following field device 300 in failed operation (an Ex-protection measure). The Zener diodes D1, D2, D3 are so selected that the Z voltage lies in the range 10-20 V, preferably about 16 V.

In order in the event of failure to limit an electrical current, which flows from the third connection terminal 204 to the field device 300 and back via the fourth connection terminal 205, an overcurrent protection system 209, for example, in the form of a melting fuse, is placed in the plus line. The overcurrent protection system 209 is in combination with the Z voltage of the Zener diodes D1, D2, D3 selected in such a manner that a power provided to the field device connected to the third and fourth connection terminals 204, 205 is limited to a maximum value (Ex power). For example, the overcurrent protection system 209 can be designed to prevent a rise of the electrical current above a maximum electrical current value of 32 mA. Thus, in the example shown in FIG. 2, an Ex power provided on the third and fourth connection terminals is limited to 870 mW (=32 mA*16V*1.7), wherein the factor 1.7 is a safety factor per the standard, DIN EN 60079-11.

In order that the Zener diodes D1, D2, D3 are not conducting, or do not become conducting, when an input voltage greater than the Z voltage of the diodes D1, D2, D3 lies across the first and second connection terminals 202, 203, the adapter electronics 201 of the invention further includes a circuit 600, which is designed to control, thus to limit, a voltage drop across the Zener diodes D1, D2, D3.

For this, the circuit 600 comprises a voltage controlled switching element 601 for establishing a voltage drop, wherein the switching element 601 is arranged in such a manner in the first and/or second line 206, 207 that the switching element 601 serves as a voltage divider for a field device 300 connected to the third and fourth connection terminals 204, 205. The switching element 601 can be a transistor, especially a field effect transistor, especially an n-channel, field effect transistor.

In order appropriately to control the switching element 601, the circuit 600 further comprises an operational amplifier 602, a voltage divider 603 as well as a feedback loop 604*a*, 604*b*. The voltage divider 603 serves to drive a negative input of the operational amplifier 602. For this, the voltage divider 603 is introduced between the plus- and minus lines 206, 207 and, preferably, embodied as a high ohm voltage divider. High ohm means, in such case, that a transverse current of not more than 20 μA, especially not more than 10 μA, quite especially not more than 5 μA, flows through the voltage divider. The voltage divider 603 is preferably formed in the ratio 1:10, e.g. a first resistor, which is connected with the plus line, can be 1 megaohm and the second resistor, which is connected to the minus line, 100 kiloohm.

Additionally present in the transverse line of the voltage divider 603 is another Zener diode D5, whose cathode is preferably connected with the plus line 206 and whose anode is preferably connected with the minus line 207. Zener diode D5 is sized in such a manner that a Z voltage is not greater than the Z voltage of the other Zener diodes D1, D2, D3. For example, the Zener diode D5 can have a Z voltage of about 13 V. Via the Z voltage of the additional Zener diode, an output voltage of the adapter, thus an input voltage for the field device, in the failure free operation is defined/determined, as soon as the Z voltage is reached, or exceeded.

The feedback loop 604*a*, 604*b* comprises a voltage divider formed of two resistors 604*a* and 604*b*, wherein the voltage divider is connected in parallel with the switching element 601, such that a voltage drop produced by the switching element 601 lies across the voltage divider and a positive input of the operational amplifier 602 is connected with a middle tap of the voltage divider. The voltage divider can be formed in the ratio 1:10, in the case of which the resistance with the higher value is connected with the higher voltage. For example, the voltage divider can be formed of a 100 kiloohm resistor and a 10 kiloohm resistor. As a result of the feedback loop 604*a*, 604*b*, the operational amplifier 602 is operated in such a manner that such is off on its output, until the voltage drop across the switching element 601 is sufficiently large that the voltage applied via the voltage divider on the positive input of the operational amplifier 602 corresponds to about the voltage on the negative input of the operational amplifier 602.

For supplying the operational amplifier 602, the adapter electronics can have a voltage control unit 605, which is inserted preferably in the first and/or second line 206, 207 in such a manner that such is connected in series with a field device 300 connected to the third and fourth connection terminals 204, 205. This offers the advantage that there is no current parallel to the third and fourth connection terminals, in order to prevent an influencing of the 4-20 mA electrical current. The voltage control unit 605 can be, for example, a diode, another Zener diode, an additional resistor and/or a reference voltage circuit. The adapter electronics can further comprise another Zener diode D4, which is used in such a manner that such is connected in parallel with the voltage control unit 605 and limits an operating voltage of the operational amplifier to a maximum value, e.g. 2 V. Furthermore, the adapter electronics 201 can have a limiting resistor R1, which is connected in front of the operational amplifier 602 and/or the additional Zener diode D4 to protect them.

An adapter electronics 201 embodied in such a manner assures that in case the supply isolator 100 provides on the first and second connection terminals 202, 203 a input voltage, which is less than the diode voltage/Z voltage of the Zener diode D1, e.g. 12V, the Zener diode D1 allows no electrical current flow and, thus, the negative input of the operational amplifier 602 is "low" and the positive input "high", such that the output of the operational amplifier 602 is "high". This leads to the fact that the switching element 601 is conducting and almost the complete voltage is available via the third and fourth connection terminals 204, 205 for the field device 300.

In the case of a higher input voltage on the first and second connection terminals 202, 203, e.g. 30 V, the adapter electronics 201 provides that the other Zener diode D5 allows an electrical current flow and, thus, the negative input of the operational amplifier 602 lies at a defined voltage value. The voltage value is set via the voltage divider 603. This voltages depends on the input voltage on the first and second connection terminals 202, 203. As soon as the input voltage rises above the diode voltage of the Zener diode D1, the input voltage on the operational amplifier 602 also rises proportionally.

The operational amplifier 602, thus, provides that a voltage difference between the negative- and positive input is minimized, in that it changes its output voltage and so controls the voltage across the switching element 601. The voltage, which is controlled with the switching element 601, is placed via the feedback loop 604*a*, 604*b* on the positive input of the operational amplifier 602. This leads to the fact that the operational amplifier 602 in the case of rising input voltage on the first and second connection terminals 202, 203 operates the switching element 601 in such a manner that it turns off, until the voltage on the positive input of the operational amplifier 602 about equals the voltage on the negative input of the operational amplifier 602.

The invention claimed is:

1. An adapter for introduction into a two-conductor line between a field device of automation technology and a non-Ex capable supply isolator to make the field device Ex capable, the adapter, comprising:

an adapter housing having first and second connecting elements for connecting a first two-conductor line via which the adapter is connectable with the supply isolator and having third and fourth connecting elements for connecting a second two-conductor line via which the adapter is connectable with the field device; and an adapter electronics arranged in the adapter housing, wherein the adapter electronics connects the first connecting element with the third connecting element using a first electrical connecting line and the second connecting element with the fourth connecting element using a second electrical connecting line such that the first connecting line conducts a loop current coming from the supply isolator from the first connecting element to the field device connectable to the third connecting element and the second connecting line conducts the loop current coming from the field device via the fourth connecting element back to the second connecting element at the supply isolator, wherein the adapter electronics further includes an overvoltage protection system designed to limit a voltage applied across the third and fourth connecting elements to a first maximum value in an event of failure, wherein the adapter electronics further includes an overcurrent protection system adapted to prevent a rise of the loop current above a maximum electrical current value in the event of failure such that a power issuable to the field device is limited, wherein the adapter electronics further includes a circuit adapted in a non-failure case to control a voltage applied to the overvoltage protection system from a minimum input voltage, which lies across the first and second connecting elements, to a second maximum value lower than the first maximum value, wherein the circuit includes a voltage controlled switching element for setting a voltage drop and arranged in the first or second connecting line that the switching element serves as a first voltage divider for the field device connectable to the third and fourth connecting elements, and wherein the circuit further includes an operational amplifier, a second voltage divider, as well as a feedback loop, wherein the operational amplifier is adapted to control the voltage controlled switching element, wherein the second voltage divider is adapted to drive a negative input of the operational amplifier using an intermediate tap as a function of an input voltage lying across the first and second connecting elements and/or the feedback loop serves to lead a voltage drop produced by the switching element back to a positive input of the operational amplifier.

2. The adapter as claimed in claim 1, wherein the minimum input voltage applied across the first and second connecting elements is greater than 3 volts.

3. The adapter as claimed in claim 1, wherein the second maximum value lies in a range from 5 to 25 volts.

4. The adapter as claimed in claim 1, wherein the overvoltage protection system includes at least three Zener diodes that are connected in parallel with the third and fourth connecting elements, wherein a cathode of each of the at least three Zener diodes is connected with the first connecting line and an anode of each of the at least three Zener diodes (D1, D2, D3) is connected, in each case, with the second connecting line.

5. The adapter as claimed in claim 3, wherein the at least three Zener diodes are so selected that a Z voltage lies in the range from 10-20 V.

6. The adapter as claimed in claim 1, wherein the second voltage divider is inserted between the first and second connecting lines and is a high ohm voltage divider such that a transverse current through the second voltage divider is not more than 20 μA.

7. The adapter as claimed in claim 6, wherein the adapter electronics further includes a voltage control unit for the voltage supply of the operational amplifier and introduced into the first and/or second connecting line in such a manner that the voltage control unit is connected in series with a field device connectable to the third and fourth connecting elements such that there is no parallel current between the first and second connecting lines.

8. The adapter as claimed in claim 7, wherein the voltage control unit includes a diode, another Zener diode, an additional resistor and/or a reference voltage circuit and/or the adapter electronics further includes another Zener diode that is embodied in such a manner that it is connected in parallel with the voltage control unit to limit an operating voltage for the operational amplifier to a maximum value and/or the adapter electronics includes a limiting resistor that is connected in front of the other Zener diode to protect the operational amplifier and/or the other Zener diode.

9. An automation system, comprising:

a non-Ex-i capable supply isolator;

an automation field device that fulfills the requirements of ignition protection type intrinsic safety Ex-i; and an adapter, including:

an adapter housing having first and second connecting elements for connecting a first two-conductor line via which the adapter is connectable with the supply isolator and having third and fourth connecting elements for connecting a second two-conductor line via which the adapter is connectable with the field device; and an adapter electronics arranged in the adapter housing, wherein the adapter electronics connects the first connecting element with the third connecting element using a first electrical connecting line and the second connecting element with the fourth connecting element using a second electrical connecting line such that the first connecting line conducts a loop current coming from the supply isolator from the first connecting element to the field device connectable to the third connecting element and the second connecting line conducts the loop current coming from the field device via the fourth connecting element back to the second connecting element at the supply isolator, wherein the adapter electronics further includes an overvoltage protection system designed to limit a voltage applied across the third and fourth connecting elements to a first maximum value in an event of failure, wherein the adapter electronics further includes an overcurrent protection system adapted to prevent a rise of the loop current above a maximum electrical current value in the event of failure such that a power issuable to the field device is limited, wherein the adapter electronics further includes a circuit adapted in a non-failure case to control a voltage applied to the overvoltage protection system from a minimum input voltage, which lies across the first and second connecting elements, to a second maximum value lower than the first maximum value, wherein the circuit includes a voltage controlled switching element for setting a voltage drop and arranged in the first or second connecting line that the switching element serves as a first voltage divider for the field device connectable to the third and fourth connecting elements, and wherein the circuit further includes an operational amplifier, a second voltage divider, as well as a feedback loop, wherein the operational amplifier is adapted to control the voltage controlled switching element, wherein the second voltage divider is adapted to drive a negative input of the operational amplifier using an intermediate tap as a function of an input voltage lying across the first and second connecting elements and/or the feedback loop serves to lead a voltage drop produced by the switching element back to a positive input of the operational amplifier, wherein the adapter is connected with the non-Ex-i capable supply isolator at the first and second connecting elements by a first two-conductor line and with the field device at the third and fourth connecting elements by a second two-conductor line.

10. The automation system as claimed in claim 9, wherein the field device is further adapted to compensate a transverse current brought about by the second voltage divider in a transmitting of measurement- and/or actuating values via the loop current.

* * * * *